(12) United States Patent
Tomimori

(10) Patent No.: US 8,896,525 B2
(45) Date of Patent: Nov. 25, 2014

(54) PORTABLE TERMINAL AND DISPLAY CONTROL METHOD THEREOF

(75) Inventor: Hiroyuki Tomimori, Tokyo (JP)

(73) Assignee: NEC Corporation, Tokyo (JP)

( * ) Notice: Subject to any disclaimer, the term of this patent is extended or adjusted under 35 U.S.C. 154(b) by 93 days.

(21) Appl. No.: 13/818,875

(22) PCT Filed: Mar. 31, 2011

(86) PCT No.: PCT/JP2011/058212
§ 371 (c)(1), (2), (4) Date: Feb. 25, 2013

(87) PCT Pub. No.: WO2012/039157
PCT Pub. Date: Mar. 29, 2012

(65) Prior Publication Data
US 2013/0169580 A1 Jul. 4, 2013

(30) Foreign Application Priority Data
Sep. 24, 2010 (JP) ................ 2010-213793

(51) Int. Cl.
G09G 5/00 (2006.01)
G06F 1/16 (2006.01)
G06F 3/041 (2006.01)
H04M 1/02 (2006.01)

(52) U.S. Cl.
CPC ......... *G06F 3/0418* (2013.01); *H04M 2250/16* (2013.01); *H04M 1/0243* (2013.01); *G06F 1/1675* (2013.01); *G06F 1/1616* (2013.01); *H04M 1/0214* (2013.01); *G06F 1/1643* (2013.01)
USPC ............................. 345/156; 345/1.1; 345/158

(58) Field of Classification Search
CPC ... G06F 1/1613; G06F 1/1616; G06F 1/1641; G06F 1/1647; G06F 3/0416; G06F 3/0488; G09G 2340/145
USPC .................... 345/1.1, 1.3, 156, 158, 169, 173
See application file for complete search history.

(56) References Cited

U.S. PATENT DOCUMENTS

| | | | |
|---|---|---|---|
| 2009/0303208 A1 | 12/2009 | Case, Jr. et al. | |
| 2010/0225601 A1* | 9/2010 | Homma et al. | 345/173 |
| 2011/0179864 A1* | 7/2011 | Raasch et al. | |

FOREIGN PATENT DOCUMENTS

| | | |
|---|---|---|
| JP | 2009-222951 | 10/2009 |
| JP | 2009-301034 | 12/2009 |
| JP | 2010-135967 | 6/2010 |

OTHER PUBLICATIONS

International Search Report, PCT/2011/058212, Jul. 5, 2011.

*Primary Examiner* — Regina Liang
(74) *Attorney, Agent, or Firm* — Young & Thompson

(57) ABSTRACT

A portable terminal includes two display element provided respectively on two housings; and detection element provided on one of the two housings and that detects the posture of the housing that is provided with the detection element. The portable terminal places first and second reference point on respective display screens of the two display element such that the spatial distance of the first and second reference point in a free space is constant, and calculates the open angle between the two housings based on the length of a perpendicular line drawn from the first reference point to the open axis, the length of a perpendicular line drawn from the second reference point to the open axis, and the length of the spatial distance; and corrects the detected detection value based on the calculated open angle and notifies an application executed on other housing of the corrected value.

8 Claims, 8 Drawing Sheets

PORTABLE TERMINAL AND DISPLAY CONTROL METHOD THEREOF

TECHNICAL FIELD

The present invention relates to a portable terminal having two housings that are foldably connected to each other and also to a display control method for the portable terminal.

BACKGROUND ART

Some recent portable terminals include two-screen type terminals having two housings that are foldably connected to each other and that are provided with respective display screens (for example, refer to Patent Literature 1).

Some two-screen type terminals are provided with acceleration sensor that detects the postures of the housings. Applications executed on such two-screen type terminals can perform processes based on the value of the acceleration sensor.

However, from a cost point of view, many two-screen type terminals may be provided with an acceleration sensor located on one of the two housings.

Thus, when an application is executed on a two-screen type terminal based on the values of an acceleration sensor, the application needs to be executed on a housing that is provided with the acceleration sensor.

RELATED ART LITERATURE

Patent Literature

Patent Literature 1: JP2009-222951A, Publication

SUMMARY OF THE INVENTION

Problem to be Solved by the Invention

However, two-screen type terminals can simultaneously operate respective applications on the two housings. Thus, two applications might be simultaneously executed based on the values of the acceleration sensors.

Thus, in the future, applications that are executed on a housing that is not provided with an acceleration sensor would need to perform processes based on the values of the acceleration sensor.

For example, as disclosed in Patent Literature 1, if an angle detection sensor that detects the open angle between two housings is provided, the values of the acceleration sensor can be corrected based on the open angle. Thus, even if an application is executed on a housing that is not provided with the acceleration sensor, the application can perform a process based on the corrected detection values.

However, according to the technique disclosed in Patent Literature 1, since an angle detection sensor need to be newly provided, the cost would rise.

Therefore, an object of the present invention is to provide a portable terminal that can solve the foregoing problem and allows an application executed on a housing that is not provided with an acceleration sensor to perform a process using the values of the acceleration sensor without it being necessary to newly provide an angle detection sensor and also to provide a display control method for the portable terminal.

Means that Solve the Problem

A portable terminal according to the present invention is a portable terminal having two housings that are foldable about an open axis at which said two housing are connected to each other, comprising:

two display means provided respectively on said two housings;

execution means that is capable of executing an application on each of said two housings;

detection means that is provided on one of said two housings and that detects the posture of the housing that is provided with said detection means;

open angle calculation means that places a first reference point and a second reference point on respective display screens of said two display means such that the spatial distance of said first reference point and said second reference point in a free space is constant, and that calculates the open angle between said two housings based on the length of a perpendicular line drawn from said first reference point to said open axis, the length of a perpendicular line drawn from said second reference point to said open axis, and the length of said spatial distance; and correction means that corrects a detection value detected by said detection means based on the open angle calculated by said open angle calculation means and notifies an application executed on other housing of the corrected detection value.

A display control method according to the present invention is a display control method for a portable terminal having two housings that are foldably connected to each other, comprising:

providing detection means on one of said two housings, the detection means detecting the posture of the housing that is provided with said detection means, placing a first reference point and a second reference point on respective display screens of said two display means such that the spatial distance of said first reference point and said second reference point in a free space is constant, and calculating the open angle between said two housings based on the length of a perpendicular line drawn from said first reference point to said open axis, the length of a perpendicular line drawn from said second reference point to said open axis, and the length of said spatial distance; and correcting a detection value detected by said detection means based on the calculated open angle and notifying an application executed on other housing of the corrected detection value.

Effect of the Invention

According to the present invention, an effect is that an application executed on a housing that is not provided with a detection means that detects the posture of the housing can perform a process based on the detection value of the detection means without it being necessary to newly provide an angle detection sensor, can be obtained.

BEST MODES THAT CARRY OUT THE INVENTION

Next, with reference to the accompanying drawings, an exemplary embodiment of the present invention will be described.

Figure 1:
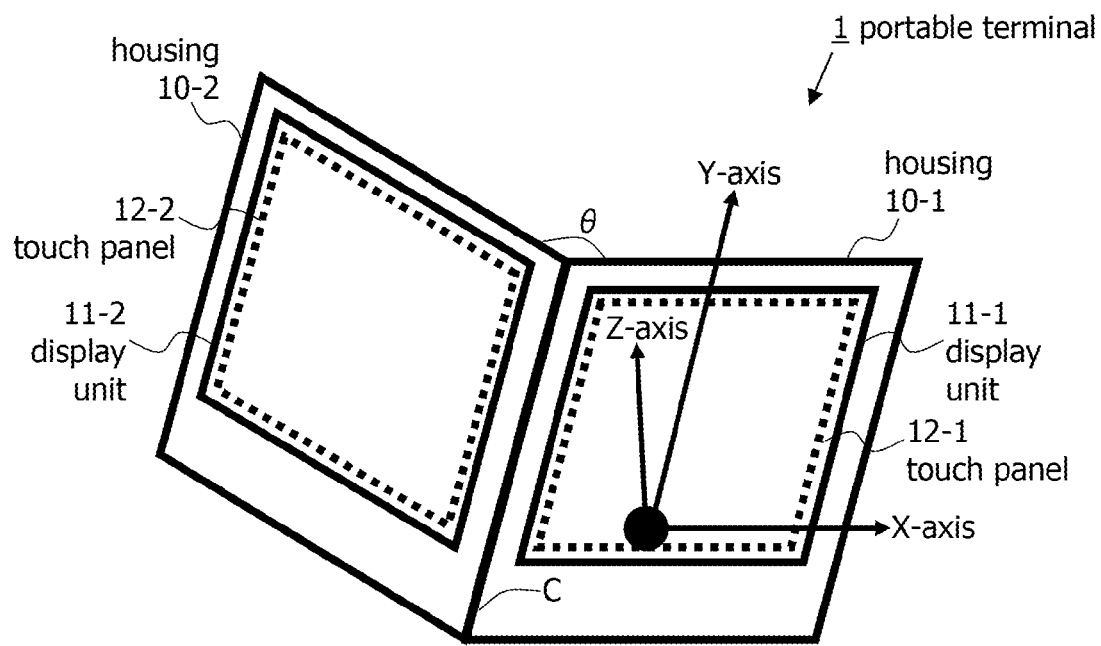
FIG. 1 is an external view showing a portable terminal according to an exemplary embodiment of the present invention.

FIG. 1 is an external view showing portable terminal 1 according to an exemplary embodiment of the present invention.

As shown in FIG. 1, portable terminal 1 according to this exemplary embodiment is a two-screen type terminal having two housings 10-1 and 10-2 that are foldable about open axis C at which two housings 10-1 and 10-2 are connected by a hinge mechanism or the like.

Housing 10-1 is provided with display unit 11-1 and touch panel (touch panel type input means) 12-1 that detects touching of display unit 11-1.

Housing 10-2 is provided with display unit 11-2 and touch panel (touch panel type input means) 12-2 that detects touching of display unit 11-2.

In this exemplary embodiment, it is assumed that detection unit 13 (refer to FIG. 2) is provided on housing 10-1. Detection unit 13 detects the accelerations in the directions of the X, Y, and Z axes of housing 10-1 so as to detect the posture of housing 10-1.

Figure 2:
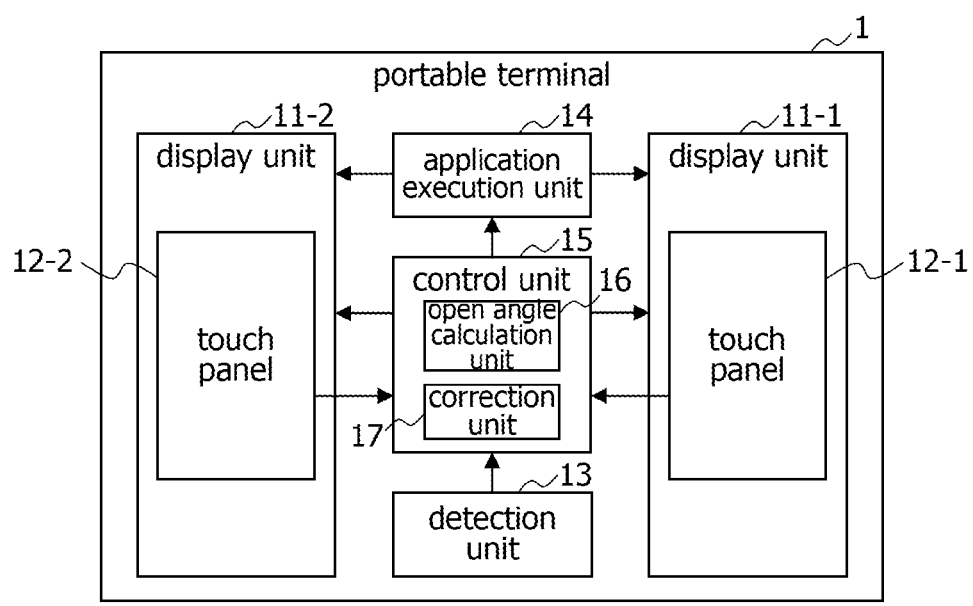
FIG. 2 is a functional block diagram of the portable terminal shown in FIG. 1.

FIG. 2 is a functional block diagram of portable terminal 1 shown in FIG. 1.

As shown in FIG. 2, portable terminal 1 according to this exemplary embodiment has display units 11-1 and 11-2, touch panels 12-1 and 12-2, detection unit 13, application execution unit 14, and control unit 15.

Detection unit 13 is provided on housing 10-1 and is a three-axis acceleration sensor that detects accelerations in directions of the X, Y, and Z axes of housing 10-1. Alternatively, detection unit 13 may be a six-axis sensor that includes a three-axis acceleration sensor and a three-axis magnetic field sensor.

Application execution unit 14 can execute applications on the display screens of display units 11-1 and 11-2.

Control unit 15 controls the operation of portable terminal 1 and has open angle calculation unit 16 and correction unit 17 that are characteristic structural elements of the present invention. In FIG. 2, other structural elements of control unit 15 are omitted.

Open angle calculation unit 16 calculates the open angle θ between two housings 10-1 and 10-2.

Correction unit 17 corrects a detection value, that represents the posture of housing 10-1 and that is detected by detection unit 13, to a detection value that represents the posture of housing 10-2 based on the open angle θ calculated by open angle calculation unit 16 and notifies an application executed on housing 10-2 of the corrected detection value.

Here, with reference to FIG. 3 and FIG. 4, a calculation method in which open angle calculation unit 16 calculates open angle θ between two housings 10-1 and 10-2 will be described in detail.

Figure 3:
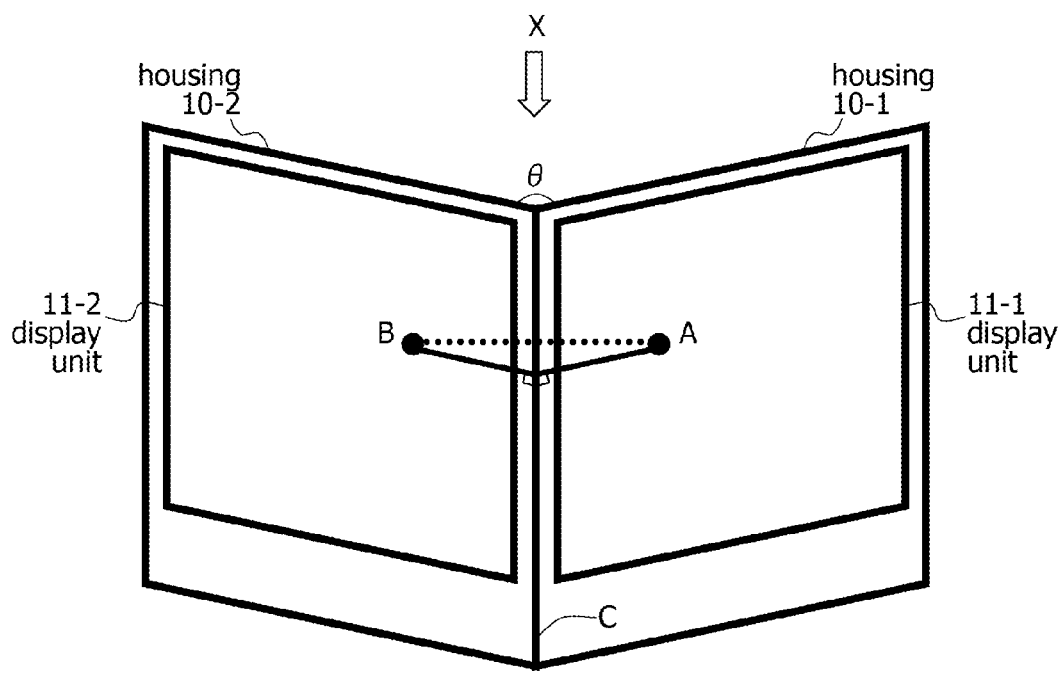
FIG. 3 is a schematic diagram describing a calculation method for the open angle between housings of the portable terminal shown in FIG. 1.

As shown in FIG. 3, first, open angle calculation unit 16 places first reference point A and second reference point B on the display screens of two display units 11-1 and 11-2, respectively, such that the spatial distance therebetween is constant in the free space. In this example, it is assumed that the coordinate position of first reference point A in the direction of open axis C is the same as the coordinate position of second reference point B in the direction of open axis C.

Thereafter, open angle calculation unit 16 obtains the length of the perpendicular line drawn from first reference point A to open axis C along housing 10-1 and the length of the perpendicular line drawn from second reference point B to open axis C along housing 10-2. These lengths can be obtained based on the coordinate positions of first reference point A and second reference point B.

Figure 4:
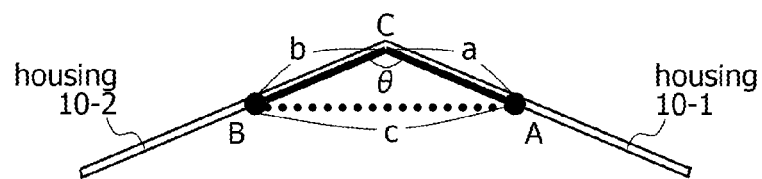
FIG. 4 is a schematic diagram showing the portable terminal shown in FIG. 3 when viewed from the X direction.

At this point, if portable terminal 1 shown in FIG. 3 is viewed from the X direction, a triangle having three vertices of first reference point A, second reference point B, and open axis C is formed as shown in FIG. 4.

Length a of the first side of the triangle corresponds to the length of the perpendicular line drawn from first reference point A to open axis C; length b of the second side of the triangle corresponds to the length of the perpendicular line drawn from second reference point B to open axis C. Although length c of the third side of the triangle corresponds to the length of the spatial distance between first reference point A and second reference point B, this length is constant as mentioned above.

Thus, open angle calculation unit 16 calculates open angle θ between two housings 10-1 and 10-2 based on lengths a, b, and c of the three sides of the foregoing triangle. According to the present invention, the calculation method for the open angle based on the lengths of the three sides of the triangle is not limited, but a known method can be used.

As described above, according to this exemplary embodiment, first reference point A and second reference point B, whose spatial distance in the free space is constant, are placed on the respective display screens of two display units 11-1 and 11-2 and open angle θ between two housings 10-1 and 10-2 is calculated based on them.

Thus, since a detection value that represents the posture of housing 10-1 can be corrected to a detection value that represents the posture of housing 10-2 based on open angle θ calculated by open angle calculation unit 16, an application executed on housing 10-2 can perform a process based on the detection value detected by detection unit 13 without it being necessary to newly provide an angle detection sensor.

WORKING EXAMPLES

Next, working examples that further embody a calculation method for open angle θ between two housings 10-1 and 10-2 will be described.

Working Example 1

Next, with reference to a flow chart shown in FIG. 5, a calculation method for open angle θ according to this working example will be described.

Figure 5:
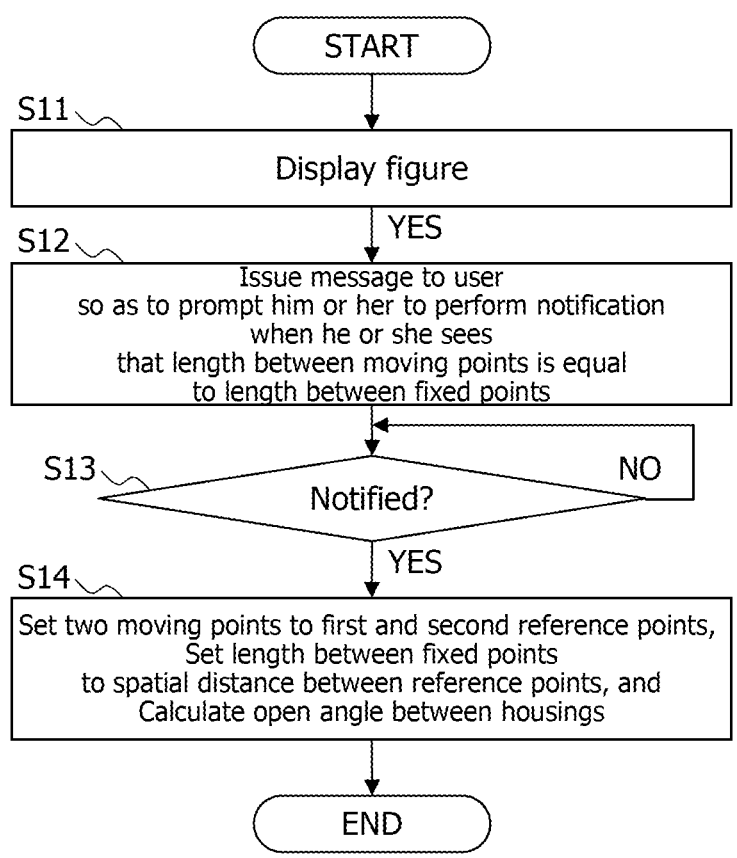
FIG. 5 is a flow chart describing a calculation method for the open angle between housings of a portable terminal according to working example 1 of the present invention.
Figure 6:
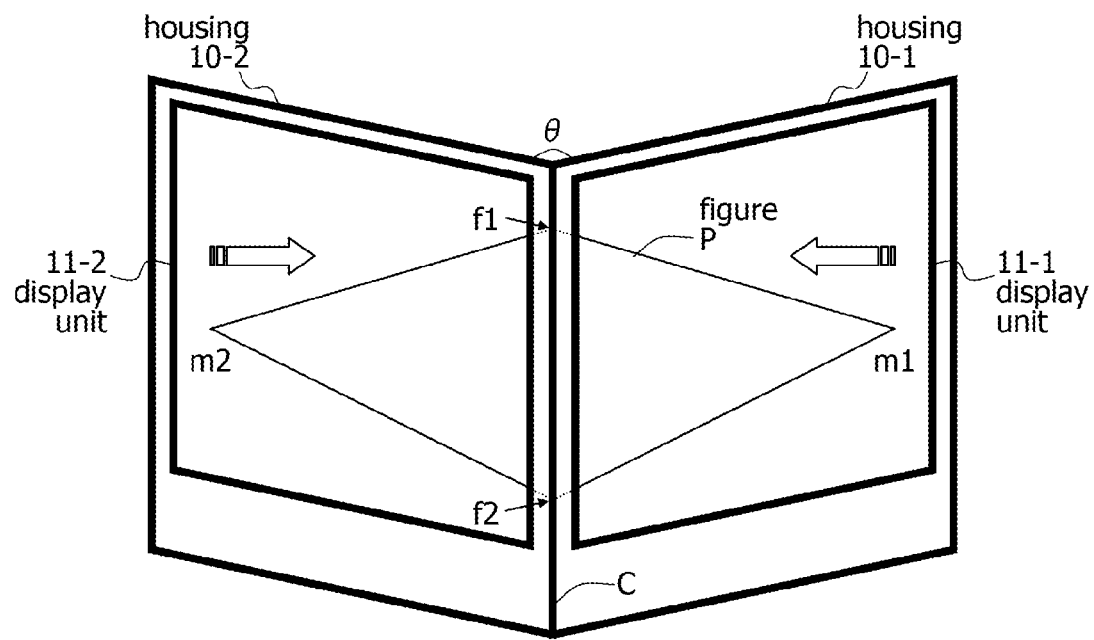
FIG. 6 is a schematic diagram describing the calculation method for the open angle between the housings of the portable terminal according to working example 1 of the present invention.
Figure 6:
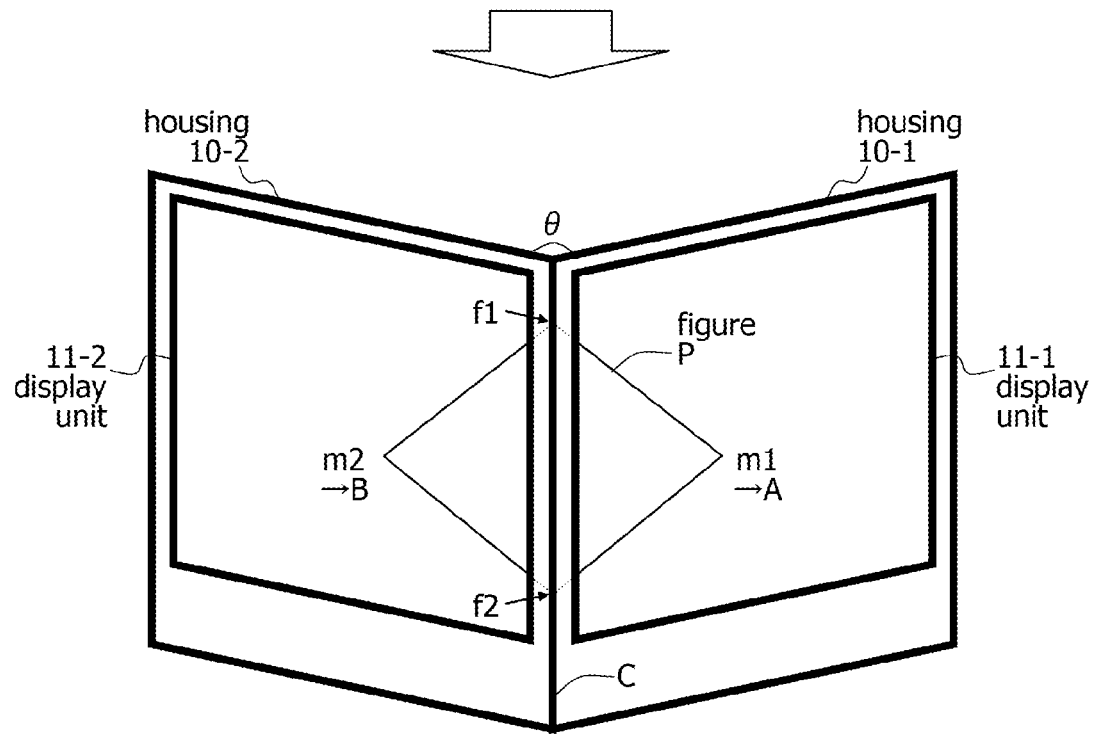

As shown in FIG. 5, first, open angle calculation unit 16 displays figure P as depicted in the upper part of FIG. 6 on the display screens of two display units 11-1 and 11-2 (at step S11). Figure P has any shape that passes through two fixed points f1 and f2 placed on open axis C and two moving points m1 and m2 symmetrically placed on a straight line perpendicular to open axis C through open axis C. In FIG. 6, figure P is a rhombus.

Thereafter, open angle calculation unit 16 issues a message to the user so as to prompt him or her to notify open angle calculation unit 16 when he or she sees that the length between two moving points m1 and m2 is equal to the length between two fixed points f1 and f2 (at step S12). As a specific example of the issue method, the message may be displayed as a visual message on display unit 11-1 or 11-2 or output as an audio message from a speaker (not shown).

Thereafter, open angle calculation unit 16 changes the shape of figure P such that moving points m1 and m2 gradually approach open axis C while fixed points f1 and f2 are kept fixed until open angle calculation unit 16 is notified by the user (YES at step S13).

Now, it is assumed that when the user notifies open angle calculation unit 16, the shape of figure P has changed as depicted in the lower part of FIG. 6. When the user notifies open angle calculation unit 16, open angle calculation unit 16 sets moving points m1 and m2 to first reference point A and second reference point B, respectively. At this point, the lengths of the perpendicular lines drawn from first reference point A and second reference point B to open axis C (corresponding to lengths a and b shown in FIG. 4) can be obtained based on the coordinate positions of first reference point A and second reference point B, respectively.

At this point, since the user sees that the length between moving points m1 and m2 is equal to the length between fixed points f1 and f2, open angle calculation unit 16 sets the length between fixed points f1 and f2 to the length of the spatial distance between first reference point A (moving point m1) and second reference point B (moving point m2) (corresponding to length c shown in FIG. 4).

Since lengths a, b, and c of the three sides of the triangle shown in FIG. 4 can be obtained as described above, open angle calculation unit 16 calculates open angle θ between two housings 10-1 and 10-2 based on these lengths a, b, and c (at step S14).

According to this working example, although it is assumed that figure P is a rhombus, figure P is not limited to this shape, but any shape is suitable, for example, a circle, as long as figure P passes through fixed points f1 and f2 and moving points m1 and m2.

Working Example 2

Next, with reference to a flow chart shown in FIG. 7, a calculation method for open angle θ according to working example 2 will be described.

Figure 7:
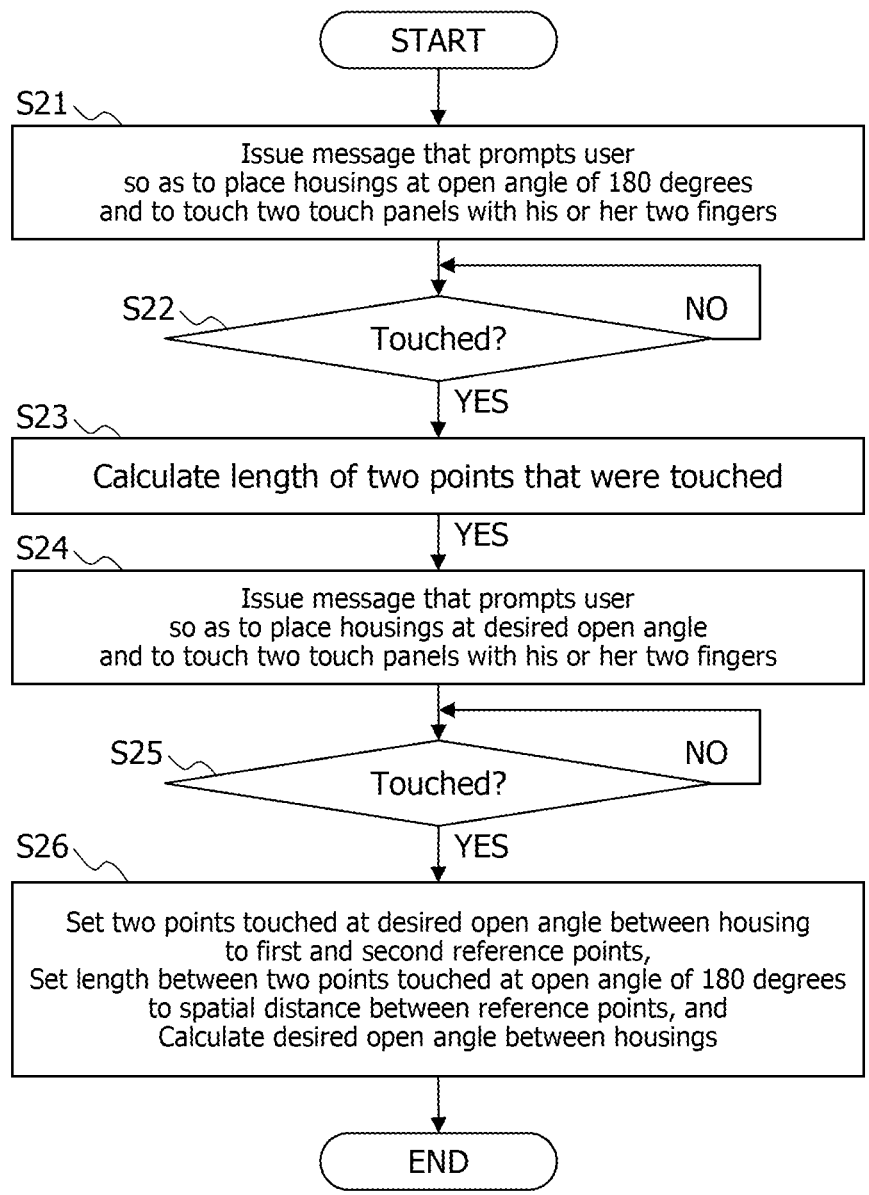
FIG. 7 is a flow chart describing a calculation method for the open angle between housings of a portable terminal according to working example 2 of the present invention.
Figure 8:
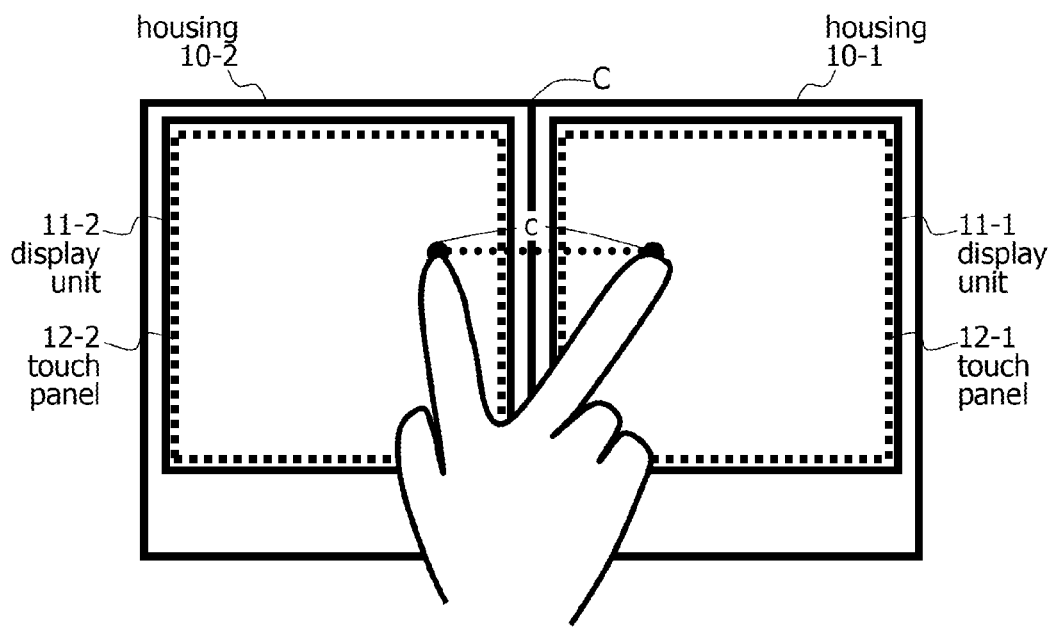
FIG. 8 is a schematic diagram describing the calculation method for the open angle between the housings of the portable terminal according to working example 2 of the present invention.
Figure 8:
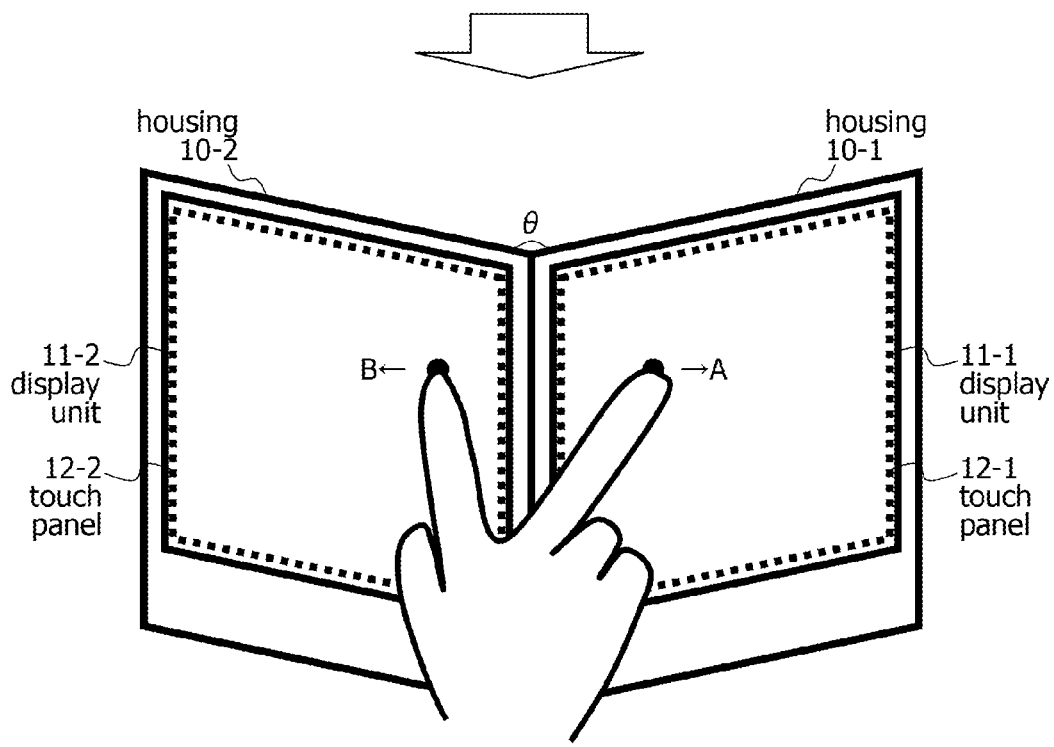

As shown in FIG. 7, open angle calculation unit 16 issues a message to the user so as to prompt the user to place two housings 10-1 and 10-2 at a predetermined open angle (for example 180 degrees) and to touch panels 12-1 and 12-2 with his or her two fingers in the state such that the spatial distance between the tips of the two fingers is kept at a constant distance as depicted in the upper part of FIG. 8 (at step S21). A specific example of the issue method is the same as that described at step S12 of FIG. 5.

When open angle calculation unit 16 detects the points on two touch panels 12-1 and 12-2 touched with user's two fingers (YES at step S22), open angle calculation unit 16 calculates the length of the distance of the straight line formed by the detected two points in the space (at step S23). This length corresponds to the length of the spatial distance between the tips of the two fingers. When the predetermined open angle is 180 degrees, the length can be easily obtained based on the coordinate positions of the detected two points.

Thereafter, as depicted in the lower part of FIG. 8, open angle calculation unit 16 issues a message to the user so as to prompt the user to place two housings 10-1 and 10-2 at a desired open angle (open angle at which portable terminal 1 is used) θ and to touch two touch panels 12-1 and 12-2 with his or her two fingers in the state such that the spatial distance between the tips of the two fingers is kept at the foregoing constant distance (at step S24). A specific example of the issue method is the same as that described at step S12 of FIG. 5.

When open angle calculation unit 16 detects the points on two touch panels 12-1 and 12-2 touched with the user's two fingers (YES at step S25), open angle calculation unit 16 sets the detected two points to first reference point A and second reference point B. At this point, the lengths of the perpendicular lines drawn from first reference point A and second reference point B to open axis C (corresponding to lengths a and b shown in FIG. 4) can be obtained based on the coordinate positions of first reference point A and second reference point B.

At this point, the length of the spatial distance between first reference point A and second reference point B corresponds to the length of the spatial distance between the tips of the two fingers. The length has been calculated at step S23. Thus, open angle calculation unit 16 sets the length calculated at step S23 to the length of the spatial distance between first reference point A and second reference point B (corresponding to length c of FIG. 4).

Since lengths a, b, and c of the three sides of the triangle shown in FIG. 4 can be obtained as described above, open angle calculation unit 16 calculates desired open angle θ between two housings 10-1 and 10-2 based on these lengths a, b, and c (at step S26).

Figure 9:
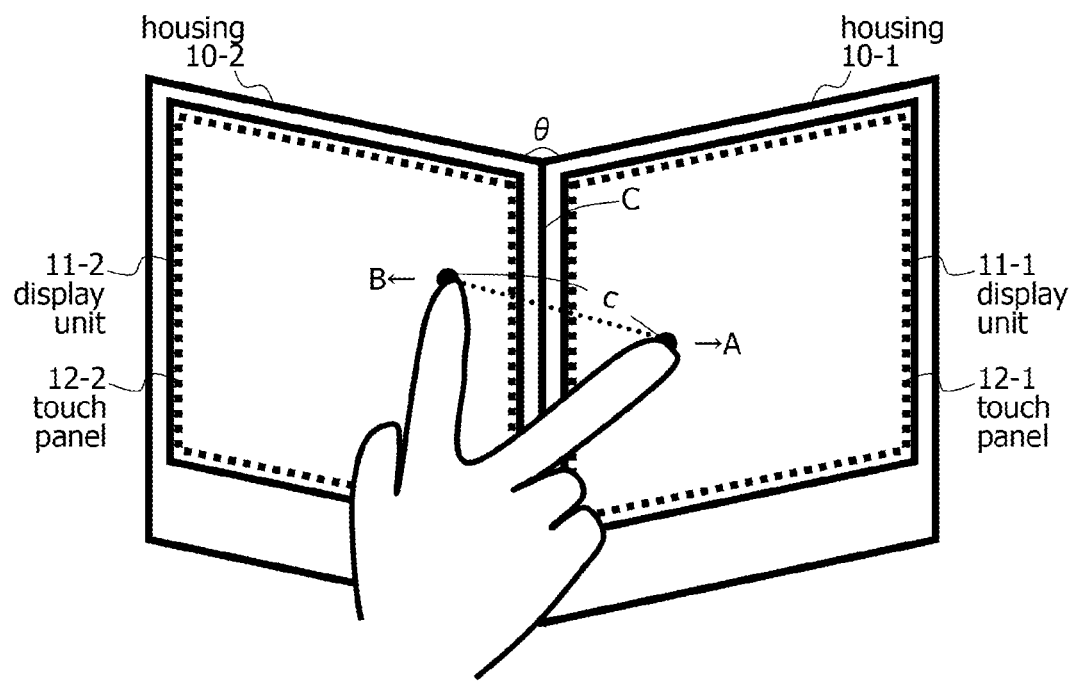
FIG. 9 is a schematic diagram describing a correction method for the length calculated at step S23 of FIG. 7 in the portable terminal according to working example 2 of the present invention.
Figure 9:
Figure 9:
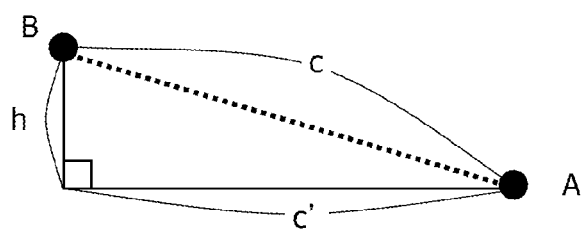

According to this working example, it is assumed that while two housings 10-1 and 10-2 are placed at the desired open angle, the coordinate positions of two points that the user touches in the direction of open axis C are nearly the same, namely the user touches two points that are nearly perpendicular to open axis C. However, the user may diagonally touch two points due to human error as shown in FIG. 9. In this case, if open angle θ is calculated based on the length calculated at step S23, it is likely that an error will occur.

Thus, according to this working example, if the user diagonally touches the two points while two housings 10-1 and 10-2 are placed at desired open angle θ, namely the coordinate positions of the detected two points are apart by equal to or greater than a predetermined distance in the direction of open axis C, the length calculated at step S23 might be corrected and open angle θ might be calculated based on the corrected value.

Specifically, a right triangle whose hypotenuse is formed between first reference point A and second reference point B is assumed. In this right triangle, height h between first reference point A and second reference point B in the direction of open axis C can be obtained based on their coordinate positions. In addition, with length c calculated at step S23, length c' of the base can be obtained.

Thus, if the user diagonally touches two touch panels 12-1 and 12-2, open angle calculation unit 16 corrects length c calculated at step S23 to c' and calculates open angle θ based on length c' used as the length of the spatial distance between first reference point A and second reference point B.

Although the user may diagonally touch two touch panels 12-1 and 12-2 at step S22, the length of the two points can be easily obtained based on the coordinate positions of the two touched points as long as the open angle between two housings 10-1 and 10-2 is 180 degrees.

Figure 10:
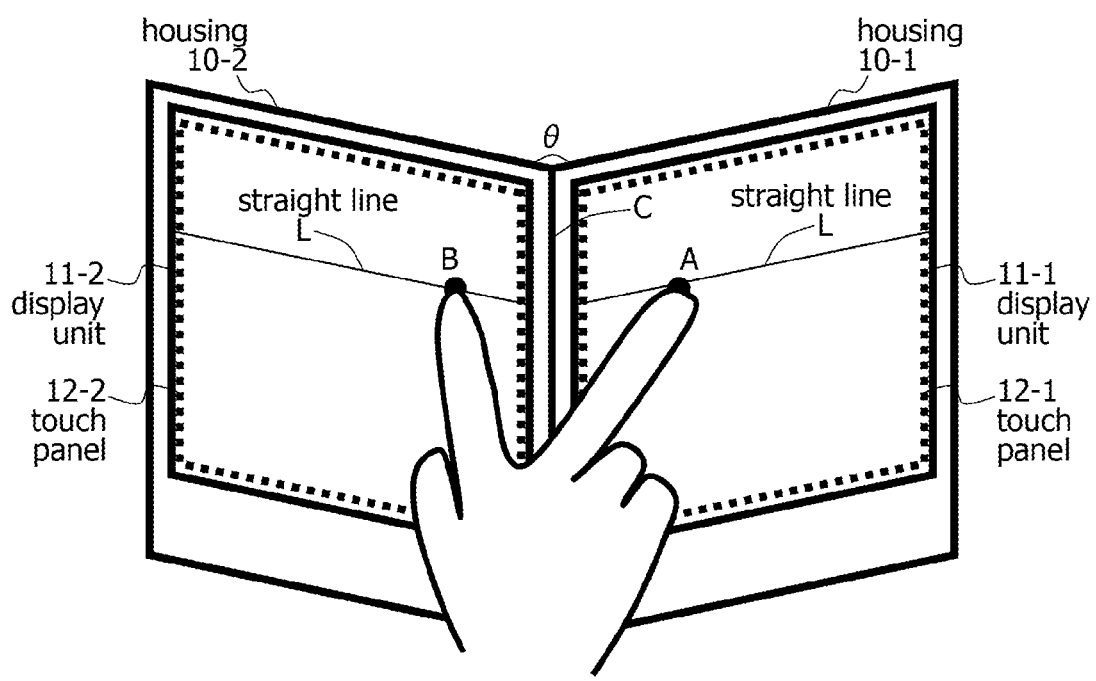
FIG. 10 is a schematic diagram describing a display screen when a message is issued at step S24 of FIG. 7 in the portable terminal according to working example 2 of the present invention.

According to this working example, to prevent the user from diagonally touching two touch panels 12-1 and 12-2 while two housings 10-1 and 10-2 are placed at desired open angle θ, as shown in FIG. 10, open angle calculation unit 16 may display straight line L that is perpendicular to open axis C on the display screens of two display units 11-1 and 11-2 and issues the message of step S24 so as to prompt the user to touch straight line L on two touch panels 12-1 and 12-2 with his or her two fingers. In this structure, the number of times the foregoing correction is performed could be remarkably reduced.

In this working example, it is assumed that the user touches two touch panels 12-1 and 12-2 with his or her two fingers, index finger and middle finger. According to the present invention, the fingers that touch two touch panels 12-1 and 12-2 are not limited, but may be any fingers.

According to this working example, it was assumed that a touching means that touches touch panels 12-1 and 12-2 is fingers. However, according to the present invention, the touching means is not limited to fingers. For example, the present invention can be applied to the case in which the touching means is a stylus pen having two tips that can be used as pen points.

With reference to the exemplary embodiment and working examples, the present invention has been described. However, it should be understood by those skilled in the art that the structure and details of the present invention may be changed in various manners without departing from the scope of the present invention.

The present application claims a priority based on Japanese Patent Application JP 2010-213793 filed on Sep. 24, 2010, the entire contents of which are incorporated herein by reference in its entirety.

The invention claimed is:

1. A portable terminal having two housings that are foldable about an open axis at which said two housing are connected to each other, comprising:
   two display units provided respectively on said two housings;
   execution unit that is capable of executing an application on each of said two housings;
   detection unit that is provided on one of said two housings and that detects the posture of the housing that is provided with said detection unit;
   open angle calculation unit that places a first reference point and a second reference point on respective display screens of said two display units such that the spatial distance of said first reference point and said second reference point in a free space is constant, and that calculates the open angle between said two housings based on the length of a perpendicular line drawn from said first reference point to said open axis, the length of a perpendicular line drawn from said second reference point to said open axis, and the length of said spatial distance; and
   correction unit that corrects a detection value detected by said detection unit based on the open angle calculated by said open angle calculation unit and notifies an application executed on other housing of the corrected detection value.

2. The portable terminal as set forth in claim 1,
   wherein said open angle calculation unit
   displays a figure on the display screens of said two display units, said figure having any shape that passes through two fixed points placed on said open axis and two moving points symmetrically placed on a straight line that is perpendicular to said open axis through said open axis, and changes the shape of said figure while said two fixed points are kept fixed such that said two moving points gradually approach said open axis,
   issues a message that prompts the user to notify said open angle calculation unit when he or she sees that the length between said two moving point is equal to the length of said two fixed points, and
   uses said two moving points, at time when the user notifies said open angle calculation unit, as said first reference point and said second reference point, uses the length between said two fixed points as the length of said spatial distance, and calculates the open angle between said two housings.

3. The portable terminal as set forth in claim 1, further comprising:
   touch panel type input unit that detects touching of each of said two display units,
   wherein said open angle calculation unit uses touching of each of said touch panel type input unit as said first reference point and said second reference point.

4. The portable terminal as set forth in claim 3,
   wherein said open angle calculation unit uses the distance of a straight line formed in the space by points detected on said touch panel type input unit when said two housings are placed at a predetermined open angle as said spatial distance.

5. The portable terminal as set forth in claim 1,
   wherein said open angle calculation unit
   issues a first message that prompts the user to place said two housings at a predetermined open angle and to touch said touch panel type input unit with a predetermined unit having tips whose spatial distance is kept at a constant distance,
   calculates the length between points detected on said touch panel type input unit while said two housings are placed at the predetermined open angle,
   issues a second message that prompts the user to place said two housings at a desired open angle and to touch said touch panel type input unit with said predetermined unit having tips whose spatial distance is kept at said constant distance, and
   uses touching of said touch panel type input unit, detected while said two housings are placed at the desired open angle, as said first reference point and said second reference point, uses the length between the points on said touch panel type input unit, detected while said two housings are placed at the predetermined open angle, as the length of said spatial distance, and calculates said desired open angle between said two housings.

6. The portable terminal as set forth in claim 5,
   wherein said open angle calculation unit issues said second message that prompts the user to touch a straight line on said touch panel type input unit, the straight line being perpendicular to said open axis on the display screens of said two display units.

7. The portable terminal as set forth in claim 6,
   wherein if the points on said touch panel type input unit detected while said two housings are placed at the desired open angle are apart by equal to or greater than a predetermined distance in the direction of said open axis, said open angle calculation unit corrects the length between the points on said touch panel type input unit detected while said two housings are placed at an open angle of 180 degrees based on the positions of the points and calculates the desired open angle between said two housings based on the corrected length used as the length of said spatial distance.

8. A display control method for a portable terminal having two display units that are provided respectively on two housings that are foldably connected to each other, comprising:
  providing detection unit on one of said two housings, the detection unit detecting the posture of the housing that is provided with said detection unit,
  placing a first reference point and a second reference point on respective display screens of said two display units such that the spatial distance of said first reference point and said second reference point in a free space is constant, and calculating the open angle between said two housings based on the length of a perpendicular line drawn from said first reference point to said open axis, the length of a perpendicular line drawn from said second reference point to said open axis, and the length of said spatial distance; and
  correcting a detection value detected by said detection unit based on the calculated open angle and notifying an application executed on other housing of the corrected detection value.

* * * * *